US010838648B2

(12) United States Patent
Sharma et al.

(10) Patent No.: US 10,838,648 B2
(45) Date of Patent: Nov. 17, 2020

(54) DISTRIBUTED HOST COPY MIGRATION IN A CLUSTER ENVIRONMENT USING CHANGED BLOCK TRACKING

(71) Applicant: EMC IP Holding Company LLC, Hopkinton, MA (US)

(72) Inventors: Shubham Sharma, Bangalore (IN); Kurumurthy Gokam, Bangalore (IN); Kundan Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 16/217,987

(22) Filed: Dec. 12, 2018

(65) Prior Publication Data
US 2020/0192593 A1 Jun. 18, 2020

(51) Int. Cl.
*G06F 3/06* (2006.01)

(52) U.S. Cl.
CPC .......... *G06F 3/0647* (2013.01); *G06F 3/0604* (2013.01); *G06F 3/064* (2013.01); *G06F 3/067* (2013.01)

(58) Field of Classification Search
CPC ...... G06F 3/0604; G06F 3/064; G06F 3/0647; G06F 3/067
USPC ........................................................ 711/154
See application file for complete search history.

(56) References Cited

U.S. PATENT DOCUMENTS

| 6,687,746 | B1 | 2/2004 | Shuster et al. |
| 6,697,875 | B1 | 2/2004 | Wilson |
| 7,454,437 | B1 | 11/2008 | Lavallee et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,386,731 | B2* | 2/2013 | Mashtizadeh ......... G06F 3/0617 711/162 |

(Continued)

OTHER PUBLICATIONS

Kris Piepho "Dell EMC SC Series Storage: Microsoft Muitipath I/O," Dell EMC Best Practices, Jan. 2017, 57 pages.

(Continued)

*Primary Examiner* — Reginald G Bragdon
*Assistant Examiner* — Aaron D Ho
(74) *Attorney, Agent, or Firm* — Ryan, Mason & Lewis, LLP

(57) ABSTRACT

An apparatus in one embodiment comprises a first host device comprising a processor coupled to a memory. The first host device is configured to assign to additional host devices different portions of a source logical unit designated for migration to a target logical unit. In conjunction with migration of the assigned portions of the source logical unit to the target logical unit by the additional host devices, the first host device is configured to receive from the additional host devices respective sets of information each characterizing one or more writes directed to the corresponding assigned portion during the migration. The first host device is further configured to update the target logical unit based at least in part on the received sets of information. In some embodiments, the first host device is configured to assign to itself a portion of the source logical unit designated for migration to the target logical unit.

20 Claims, 3 Drawing Sheets

(56) References Cited

U.S. PATENT DOCUMENTS

| | | | |
|---|---|---|---|
| 8,639,808 B1* | 1/2014 | Vemuri | G06F 3/067 709/225 |
| 9,400,611 B1 | 7/2016 | Raizen | |
| 9,594,780 B1 | 3/2017 | Esposito et al. | |
| 9,778,852 B1 | 10/2017 | Marshak et al. | |
| 2004/0010563 A1 | 1/2004 | Forte et al. | |
| 2007/0174849 A1 | 7/2007 | Cheung et al. | |
| 2008/0043973 A1 | 2/2008 | Lai et al. | |
| 2010/0313063 A1 | 12/2010 | Venkataraja et al. | |
| 2011/0197027 A1 | 6/2011 | Balasubramanian et al. | |
| 2011/0179415 A1* | 7/2011 | Donnellan | G06F 9/45558 718/1 |
| 2013/0159998 A1* | 6/2013 | Cawlfield | G06F 9/45558 718/1 |
| 2013/0326182 A1* | 12/2013 | Bavishi | G06F 3/0613 711/165 |
| 2014/0105068 A1 | 4/2014 | Xu | |
| 2015/0324236 A1* | 11/2015 | Gopalan | G06F 9/5088 711/162 |
| 2016/0117113 A1 | 4/2016 | Li et al. | |
| 2019/0018808 A1* | 1/2019 | Beard | H04L 49/35 |

OTHER PUBLICATIONS

NVM Express, "NVM Express, Revision 1.3," NVM Express, May 1, 2017, 282 pages.

U.S. Appl. No. 15/849,828 filed in the name of Sanjib Mallick et al., filed Dec. 21, 2017 and entitled "Storage System with Input-Output Performance Control Utilizing Application Process Detection."

VMWARE, "Multipathing Configuration for Software iSCSI Using Port Binding," Technical White Paper, Apr. 25, 2012, 15 pages.

Dell EMC, "Dell EMC SC Series Storage: Microsoft Muitipath I/O," Dell EMC Engineering, Jun. 2017, 56 pages.

Dell EMC, "Dell EMC PowerPath Family: PowerPath and PowerPath/VE Muitipathing," Data Sheet, 2017, 3 pages.

U.S. Appl. No. 15/795,653, filed in the name of Maneesh Pusalkar et al., filed Oct. 27, 2017 and entitled "Storage System with Network-Wide Configurable Device Names."

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

* cited by examiner

DISTRIBUTED HOST COPY MIGRATION IN A CLUSTER ENVIRONMENT USING CHANGED BLOCK TRACKING

FIELD

The field relates generally to information processing systems, and more particularly to storage in information processing systems.

BACKGROUND

Storage arrays and other types of storage systems are often shared by multiple host devices over a network. A given host device may comprise a multipath input-output (MPIO) driver that is configured to process input-output (IO) operations for delivery from the given host device to the storage system, in some cases, the storage systems may implement a cluster environment where multiple host devices service a cluster of storage devices. Data migration techniques are used to move or "migrate" data from one storage device or logical unit (LUN) of a storage device to another for any of a variety of purposes, such as upgrading storage hardware or information lifecycle management.

SUMMARY

Many storage systems use a single host device for migrating existing data from a source LUN to a target LUN which often requires a substantial amount of time to complete. As the time required to complete the migration increases, the number of received writes directed to the source LUN during the data migration also increases. Since the host device needs to process and copy these writes to the target LUN iteratively after the migration of existing data has completed to synchronize the source and target LUNs, increased migration times may cause significant additional time and resources to be spent completing the migration and synchronizing the source and target LUNs. This leads to inefficiencies in the storage system as well as in the host device performing the data migration.

Such drawbacks are advantageously overcome in illustrative embodiments by utilizing the distributed data migration techniques disclosed herein to implement functionality for migrating data in a clustered storage system. For example, by distributing the data migration of the existing data and the recording of writes received during the data migration to multiple host devices in a cluster, the time needed to perform the migration of the existing data may be significantly reduced. In addition, the number of writes that need to be recorded during the migration of the existing data will also be reduced (e.g., due to a shorter period of time needed for the migration of the existing data), leading to fewer required iterations by a master host device to achieve synchronization of the source and target LUNs and commitment of the data migration after the migration of the existing data is completed.

In one embodiment, an apparatus comprises a first host device, also referred to in some cases as a master host device, comprising a processor coupled to a memory. The first host device is configured to assign to additional host devices different portions of a source logical unit designated for migration to a target logical unit. In conjunction with migration of the assigned portions of the source logical unit to the target logical unit by the additional host devices, the first host device is configured to receive from the additional host devices respective sets of information each characterizing one or more writes directed to the corresponding assigned portion during the migration. The first host device is further configured to update the target logical unit based at least in part on the received sets of information.

In some embodiments, the first host device is configured to assign to itself a portion of the source logical unit designated for migration to the target logical unit.

In additional embodiments, the portions are determined based at least in part on a storage capacity of the source logical unit.

In another embodiment, the first host device is configured to determine a number of host devices that are associated with the source logical unit and the portions are determined based at least in part on the determined number of host devices.

In some embodiments, the sets of information each characterizing one or more writes directed to the corresponding assigned portion during the migration are generated by the additional host devices based at least in part on changed block tracking in which the additional host devices track writes directed to the corresponding assigned portions of the source logical unit during the migration.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
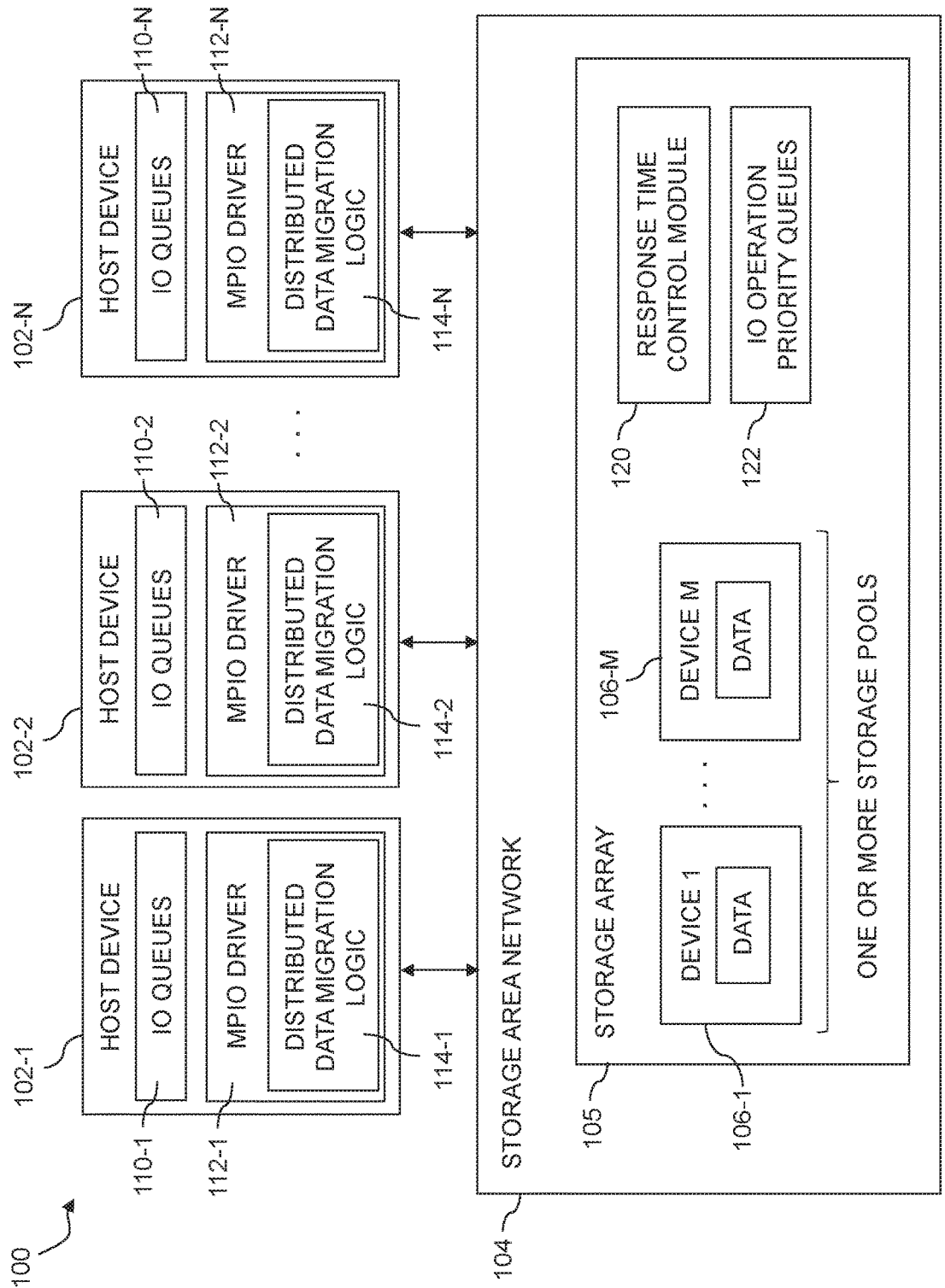
FIG. 1 is a block diagram of an information processing system configured with functionality for distributed data migration in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement LUNs configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multipath layer of the host devices 102. The multipath layer provides functionality for distributed data migration logic 114-1, 114-2, . . . 114-N implemented within the MPIO drivers 112.

MPIO drivers typically group all paths from a host device to a LUN into a single logical device known as a multipath logical device. The individual block devices representing each path are known as native devices. Applications use a multipath logical device for IO operations so that the IO operations may be distributed across all available paths. When paths fail, the MPIO driver will typically redirect the IO operations to other alive paths in the multipath logical device.

The MPIO drivers described herein may comprise, for example, otherwise conventional MPIO drivers, such as PowerPath® drivers from Dell EMC of Hopkinton, Mass., suitably modified in the manner disclosed herein to implement functionality for distributed data migration. Other types of MPIO drivers from other driver vendors may be suitably modified to incorporate functionality for distributed data migration as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers 112 collectively comprise a multipath layer of the host devices 102. The MPIO drivers 112 provide functionality for distributed data migration, for example, using respective distributed data migration logic 114-1, 114-2, . . . 114-N implemented within the MPIO drivers 112.

In some embodiments, migration involves synchronizing the target storage device or LUN to the source storage device or LUN, i.e., achieving an operating state in which the target storage device or LUN stores the same data as the source storage device or LUN, and then a path flip operation is performed so that subsequent accesses of the data are directed to the target storage device or LUN instead of the source storage device or LUN. Once the path flip operation is successfully accomplished, the source storage device or LUN can be taken out of service or put to some other use.

A number of data migration technologies are available to migrate data from a source LUN to a target LUN. One such data migration tool is Dell EMC PowerPath® Migration Enabler (PPME). PowerPath®, of which PPME is one component, is available on common operating systems such as Linux, Windows, AIX and VMware ESX. PPME uses multiple data transfer technologies for data migration including, for example, host copy, open replicator, and other similar technologies.

In some embodiments, clustering is used in computer systems to provide certain desirable functionality and characteristics from the perspective of external users. Advantages include increased performance and availability over non-clustered systems. Two general types of clusters are "failover" and "active-active" (or "parallel") clusters. In a failover cluster, all cluster nodes may be aware of a given storage device accessible in the cluster, but in general a given storage device is accessed by only one node during operation. In the event of node failure, a failover mechanism causes ownership of the storage device to be transferred to a new node that has assumed responsibility for the workload of the failed node. Due to the single-node access, there is no need for synchronizing accesses among the host devices. In active-active clusters, storage devices may be actively accessed from all nodes in the cluster, and the operating software (e.g., application software) of the nodes is responsible for synchronizing access to shared storage resources.

Multiple hosts devices are present in a clustered storage environment. When using the host copy data transfer technology in such an environment, only a single host device in the cluster performs the data migration. Since the data migration is only performed by one host device, the data migration may be slow and it may take a significant amount of time to complete migration of the data. For example, the time taken to complete migration of the data may be proportional to the size of the source LUN.

During migration, changed block tracking (CBT) is performed by the host device to determine what blocks have been changed in the source LUN since the data migration started and information generated during the CBT about any changed blocks is stored in CBT records. The number of changed blocks, as tracked by the CBT, will often be proportional to the time required to migrate the data, for example, since IO operations continue to be serviced during the data migration. As the time required to migrate the data increases, the number of changed blocks will also increase, thereby further increasing the migration time as the host device will be required to copy the changed blocks to the target LUN. An example of data migration using changed block tracking may be found in U.S. Pat. No. 9,400,611, entitled "Data Migration in Cluster Environment Using Host Copy and Changed Block Tracking," the entirety of which is incorporated herein by reference.

In illustrative embodiments, the migration time may be reduced in clustered storage systems by implementing distributed data migration logic 114 on the host devices 102.

Figure 2:
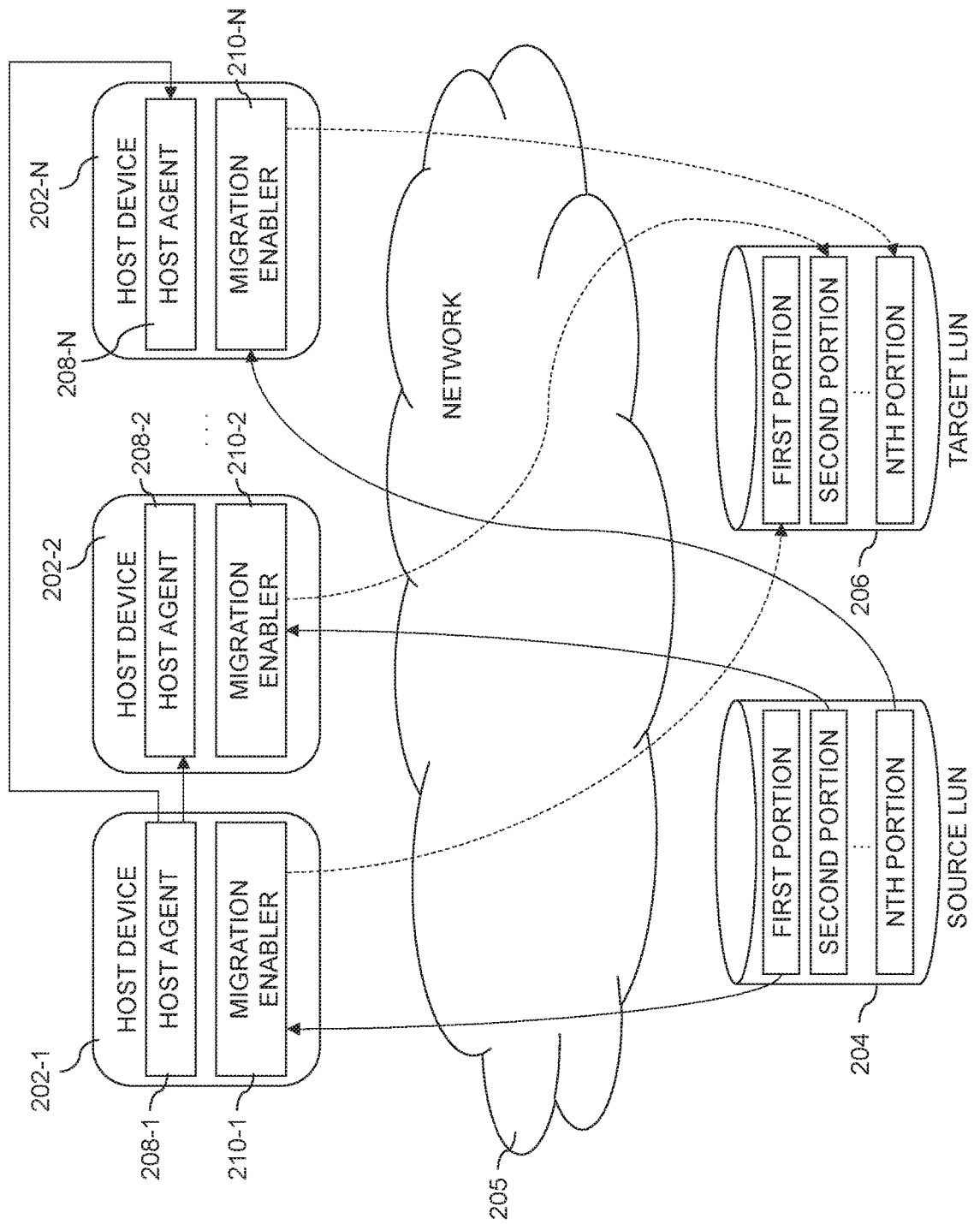
FIG. 2 is a block diagram illustrating an example distributed data migration arrangement in an illustrative embodiment.

With reference now to FIG. 2, in a cluster of host devices 202-1, 202-2, . . . 202-N, when a user initiates a migration of data from a source LUN 204 to a target LUN 206 using a particular host device 202, e.g., host device 202-1, that host device 202 may act as a master host device for the data migration. In illustrative embodiments, the cluster of host devices 202 may comprise some or all of host devices 102 (FIG. 1). For example, in some embodiments host devices 202 may comprise a subset of host devices 102 (FIG. 1) that are associated with the same LUN or LUNs where the indicator N in FIG. 1 may represent a different number of host devices than the indicator N in FIG. 2. While host device 202-1 acts as a master host device in an illustrative embodiment, any other host device 202 may act as the master host device. For example, if a user alternatively uses host device 202-2 to initiate the data migration, host device 202-2 may act as the master host device.

The master host device is configured to coordinate the actions of multiple host devices 202 of a cluster to implement the data migration in a distributed manner, e.g., by coordinating a host copy migration across the host devices 202 associated with the cluster. The master host device communicates with the other host devices associated with the cluster via host agents 208-1, 208-2, . . . 208-N, respectively, also described herein generically as host agents 208. An example host agent is the PowerPath® Management Appliance (PPMA), which is included as part of PowerPath®, or any other host agent which can enable communications between host devices 202.

For example, using the host agent 208-1, the master host device, e.g., host device 202-1 in this example, distributes the "host copy migration job" across all host devices 202 associated with the cluster, e.g., host devices 202-1 . . . 202-N. In some embodiments, the master host device, e.g., 202-1, is configured to obtain a cluster host device count which identifies the number of host devices 202 associated with the cluster. In some embodiments, the cluster host device count may also comprise an indication of which host devices 202 are associated with the cluster. The master host device is also configured to obtain the capacity of the source LUN 204, e.g., the size of the source LUN 204 or size of the data on the source LUN 204 to be migrated.

In some embodiments, the master host device is configured to determine the portion of the data migration that each associated host device 202 will perform. The data migration may be performed by each associated host device 202 using a respective migration enabler 210-1, 210-2, . . . 210-N, also described herein generically as migration enablers 210, such as, e.g., PPME as described above. In some embodiments, the migration enablers 210 communicate with the source LUN 204 and target LUN 206 via a network 205. Network 205 may, for example, include similar functionality to SAN 104, described above, and in some embodiments may comprise SAN 104.

In some embodiments, the master host device may divide the capacity of source LUN 204 by the number of associated host devices 202 in the cluster where each associated host device 202 performs the data migration for a portion of the capacity equal to the result.

As a more particular example, if the source LUN capacity obtained by the master host device is 100 Gigabytes (GB), and the host device count obtained by the master host device is 4, the resulting share is 100/4=25 GB per associated host device 202. Therefore, the master host device assigns each host device 202 a 25 GB portion of the source LUN 204 to migrate to the target LUN 206, e.g., using the host copy data migration technology.

In such an embodiment, a first host device 202 is assigned to migrate a first portion of the source LUN 204 to the target LUN 206, e.g., the first 25 GB, a second host device 202 is assigned to migrate a second portion of the source LUN 204 to the target LUN 206, e.g., the second 25 GB, a third host device 202 is assigned to migrate a third portion of the source LUN 201 to the target LUN 206, the third 25 GB, and fourth host device 202 is assigned to migrate a fourth portion of the source LUN 204 to the target LUN 206, e.g., the fourth 25 GB. The master host device is configured to communicate these assignments to the other associated host devices 202, i.e., host device 202-1, 202-2, . . . 202-N, for example, using the host agent 208 residing on each of the host devices 202. The data migration may also be triggered by the master host device by sending a command to each associated host device 202 having an assigned share, e.g., via the host agents 208. In some embodiments, the master host device may be assigned to perform a portion of the distributed migration. In some embodiments, the master host device may divide the portions among the associated host devices 202 without assigning a portion to itself.

In some embodiments, each host device 202 individually completes migration of the corresponding assigned portion using a respective migration enabler 210 such as, e.g., PPME, and also performs CBT to generate records for new writes to the data blocks corresponding to the assigned potion of the source LUN 204 that are received during the data migration. Upon completion of the data migration for the assigned portion, each host device 202 (other than the master host device) transmits a message comprising an indication that the data migration of the assigned portion has completed to the master host device, e.g., via the host agents 208. Each host device 202 also provides the master host device with information about the CBT records for the data blocks corresponding to the assigned portion. For example, the information about the CBT records may indicate what new writes have targeted the assigned portion of the source LUN 204 during the data migration. The information about the CBT may be included with the transmitted message or provided separately to the master host device. In some embodiments, the transmission of the information about the CBT records may, on its own, indicate to the master host device that the data migration for that assigned portion has been completed without requiring a separate indication of completion.

Once the master host device receives a message from each of the associated host devices 202, the master host device determines whether the data migration of all of the assigned portions has been completed. For example, if the master host device has completed migration of its own assigned portion and has received messages from each of the other associated host devices 202 indicating that they have completed migration of their respective portions, the master host device may determine that the data migration of the assigned portions has completed. In the case where the master host device does not perform data migration for one of the portions, the master host device may determine that the data migration of the assigned portions has completed if the master host device has received messages from each of the other associated host devices 202 indicating that they have completed migration of their respective portions.

Responsive to determining that the data migration of the assigned portions has completed, the master host device initiates updating of the target LUN 206 for any writes that were targeted for the assigned portions, for example, based on the information about the CBT records received from each associated host device 202 and on the information about the CBT records associated with the master host device's portion (e.g., if the master host device performed data migration for one of the portions). During updating of the target LUN 206 for the recorded writes, the master host device also generates a new set of CBT records to record information about any new writes directed toward the source LUN 204.

In some embodiments, the master host device need not wait for all of the host devices 202 to complete migration before initiating updating of the target LUN 206 for writes that were directed toward the assigned portions of the source LUN 204. For example, the master host device may receive an indication of completion and information about CBT records for an assigned portion from one or more of the host devices 202 while other host devices 202 are still performing the data migration. In such a case, the master host device may initiate updating of the target LUN 206 for any writes directed toward the assigned portions of the source LUN 204 corresponding to those host devices 202 from which the indication of completion and information about the CBT records have been received. This action may be taken, for example, since these assigned portions have already been migrated to the target LUN 206 and any further writes found in the received information about the CBT records for these assigned portions will only change the corresponding portions in the target LUN 206 that have already been migrated. For example, the master host device may begin performing the updates to the target LUN 206 for these recorded writes while waiting for the remaining host devices 202 to complete the data migration for their assigned portions.

When the target LUN 206 has been updated for any writes that were recorded in the CBT records for the assigned portions, the master host device begins updating the target LUN 206 for the recorded writes associated with the new CBT records. During this process, the master host device may generate yet another set of new CBT records for any further writes directed to the source LUN 204. This process of updating the target LUN 206 with recorded writes and generating CBT records for new writes may be iteratively performed by the master host device until a threshold has been reached, for example, a certain percentage of synchronization between the source LUN 204 and target LUN 206 has been achieved.

For example, as a general matter, the amount of data being migrated, and hence the time required at each iteration, decreases over the set of iterations. By distributing the first iteration, i.e., the initial data migration performed according to the portions assigned to each host device 202 by the master host device, the initial time impact may be reduced. For example, by migrating the largest portion of the data from the source LUN 204 to the target LUN 206 in a distributed manner, the amount of time spent during the data migration as a whole may be significantly reduced, since the number of outstanding writes occurring during the initial data migration, as tracked by the associated host devices 202 using CBT, is also reduced. In addition, by distributing the tracking of writes and generation of the corresponding CBT records between the associated host devices 202 according to the assigned portion of the source LUN 204, the load of performing CBT during the initial data migration on any individual host device 202 may be reduced thereby freeing up resources for use in performing other operations of the system.

Each subsequent iteration, i.e., updating the target LUN 206 for the writes recorded in the CBT records during the prior iteration, will last sufficiently long to copy the data blocks associated with those recorded writes. Al the end of each iteration, there will remain a set of most recently written blocks recorded in the CBT records of the master host device that still need to be updated to the target LUN 206.

In some embodiments, the iterations continue until the number of remaining writes is sufficiently small. This is because for a final iteration it is necessary to temporarily suspend application IO operations to perform a final synchronization of the source LUN 204 and target LUN 206 and complete the data migration. Such a suspension represents a performance penalty to the system that may be minimized by delaying the final iteration until the number of remaining writes is sufficiently small. As an example, the threshold amount for a sufficiently small number of writes may be a percentage of synchronization between the source LUN 204 and the target LUN 206, e.g., 95%, 97%, 99%, or any other amount. As another example, the threshold amount for a sufficiently small number of writes may be a particular amount of memory, number of sectors, or any other metric. In some embodiments, the threshold amount for a sufficiently small number of remaining writes may depend on a throughput or writes per second of the system where, for example, a system handling a larger number of writes per second may have a higher threshold than a system handling a smaller number of writes per second, or vice versa. Different criteria or mechanisms may be used to stop the iterating in different embodiments.

In some embodiments, the master host device may transmit an IO suspension command to the associated host devices 202 that instructs the associated host devices 202 to suspend IO operations. Responsive to receiving indications from each of the associated host devices 202 that the IO operations are suspended, the master host device may complete the final synchronization to synchronize the source LUN 204 and target LUN 206. Once the source LUN 204 and target LUN 206 are synchronized, the master host device may issue a command to each of the associated host devices 202 to resume IO operations on the system.

Once the source LUN 204 and target LUN 206 have been fully synchronized, the data migration is complete and the master host device triggers a committed state in which the target LUN 206 is used in place of the source LUN 204 in the system and the source LUN 204 is released or re-allocated as necessary by the system. In some embodiments, the master host device may trigger the committed state in response to a user input. In some embodiments, the master host device may trigger the committed state automatically in response to the full synchronization of the source LUN 204 and target LUN 206.

Illustrative embodiments of the techniques and functionality of distributed data migration logic 114 will now be described in more detail with reference to the flow diagram of FIG. 3.

Figure 3:
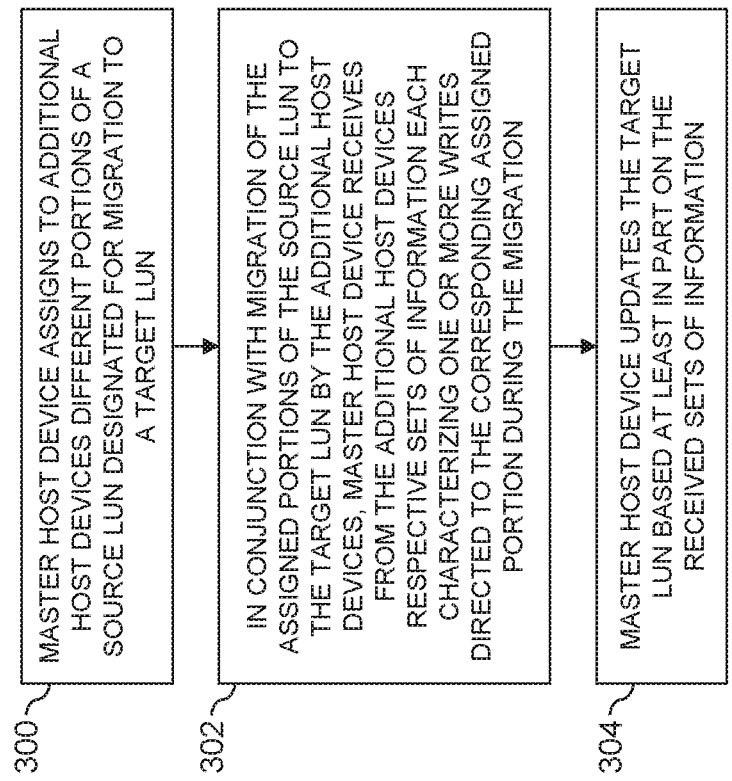
FIG. 3 is a flow diagram of a process for distributed data migration in an illustrative embodiment.

The process as shown in FIG. 3 includes steps 300 through 304, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes. The process will be described with reference also to FIG. 2.

At 300, the master host device, e.g., host device 202-1, assigns to additional host devices, e.g., host devices 202-2 . . . 202-N as described above, different portions of a source LUN 204. designated for migration to a target LUN 206, for example, using host agents 208 as described above.

At 302, in conjunction with migration of the assigned portions of the source LUN 204 to the target LUN 206 by the additional host devices, the master host device receives from the additional host devices 202 respective sets of information each characterizing one or more writes directed to the corresponding assigned portion during the migration, for example, using host agents 208 as described above.

At 304, the master host device updates the target LUN 206 based at least in part on the received sets of information. For example, the master host device may update the target LUN 206 using the iterative process described above.

Separate instances of the FIG. 3 process may be performed in respective additional host devices that share the storage array.

The particular processing operations and other system functionality described in conjunction with the flow diagram of FIG. 3 are presented by way of illustrative example only, and should not be construed as limiting the scope of the disclosure in any way. Alternative embodiments can use other types of processing operations involving host devices, storage systems and distributed data migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different distributed data migration logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for migrating data in a clustered storage system are carried out at least in part under the control of its distributed data migration logic 114. For example, distributed data migration logic 114 is illustratively configured to control performance of portions of the process shown in the flow diagrams described above in conjunction with FIG. 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for distributed data migration. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support distributed data migration in a cluster environment.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for distributed data migration as disclosed herein, many storage systems use a single host device for migrating data from a source LUN to a target LUN which often requires a substantial amount of time to complete. As the time required to complete the migration increases, the number of writes recorded in CBT records during the migration also increases. As the host device also needs to process and iterate over these CBT recorded writes, significant additional time and resource usage may be spent. This leads to inefficiencies in the storage system as well as in the host device performing the data migration.

Such drawbacks are advantageously overcome in illustrative embodiments herein by utilization of distributed data migration logic 114 to implement functionality for migrating data in a clustered storage system as described above. For example, by distributing the data migration of the initial data and recording of writes in CBT records among multiple host devices in the cluster, the time needed to perform the initial data migration may be significantly reduced. In addition, the number of writes that need to be recorded in the CBT records during the initial data migration will also be reduced (e.g., due to a shorter period of time needed for the initial data migration), leading to fewer required iterations by the master host device to achieve completion and commitment of the data migration after the initial data migration is completed.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support distributed data migration from a source LUN to a target LUN as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, drivers 112 and distributed data migration logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the distributed data migration logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, distributed data migration logic and additional or alternative components. Also, the particular configurations of system and device elements and associated processing operations illustratively shown in the drawings can be varied in other embodiments. For example, a wide variety of different MPIO driver configurations and associated distributed data migration arrangements can be used in other embodiments. Moreover, the various assumptions made above in the course of describing the illustrative embodiments should

What is claimed is:

1. An apparatus comprising:
a first host device comprising a processor coupled to a memory, the first host device being configured to communicate with a storage system over a network, the storage system comprising a plurality of storage devices, one or more of the storage devices comprising a source logical unit that is designated for migration to a target logical unit;
the first host device being configured:
to assign to additional host devices different portions of the source logical unit designated for migration to the target logical unit, each of the additional host devices being configured to migrate the corresponding assigned portion of the source logical unit to the target logical unit;
in conjunction with migration of the assigned portions of the source logical unit to the target logical unit by the corresponding additional host devices, to receive from the additional host devices respective sets of information each characterizing one or more writes directed to their corresponding assigned portions of the source logical unit during the migration of their corresponding assigned portions of the source logical unit to the target logical unit; and
to update the target logical unit based at least in part on the received sets of information.

2. The apparatus of claim 1 wherein the portions assigned to each of the additional host devices are equal in size.

3. The apparatus of claim 1 wherein the first host device is configured to assign to itself a portion of the source logical unit designated for migration to the target logical unit.

4. The apparatus of claim 1 wherein the portions are determined based at least in part on a storage capacity of the source logical unit.

5. The apparatus of claim 1 wherein the first host device is configured to determine a number of host devices that are associated with the source logical unit, and wherein the portions are determined based at least in part on the determined number of host devices.

6. The apparatus of claim 1 wherein the sets of information each characterizing one or more writes directed to the corresponding assigned portion during the migration are generated by the additional host devices based at least in part on changed block tracking in which the additional host devices track writes directed to the corresponding assigned portions of the source logical unit during the migration.

7. The apparatus of claim 1 wherein the first host device is further configured, in conjunction with updating the target logical unit based at least in part on the received sets of information, to generate one or more additional sets of information characterizing one or more new writes directed to the source logical unit.

8. The apparatus of claim 7 wherein the first host device is further configured to iteratively:
update the target logical unit based at least in part on the one or more additional sets of information characterizing the one or more new writes; and
in conjunction with updating the target logical unit based at least in part on the one or more additional sets of information characterizing the one or more new writes, to generate one or more additional sets of information characterizing one or more new writes directed to the source logical unit.

9. The apparatus of claim 8 wherein the first host device is configured to iterate the updating of the target logical unit based at least in part on the one or more additional sets of information and the generating of one or more additional sets of information until a predetermined condition is met.

10. The apparatus of claim 9 wherein responsive to the predetermined condition being met, the first host device is further configured to cause a suspension of input-output operations, to complete updating of the target logical unit based at least in part on any of the remaining one or more additional sets of information, to cause a re-direction of new input-output operations from the source logical unit to the target logical unit, and to cause a resumption of input-output operations.

11. A method comprising:
assigning, by a first host device that is configured to communicate with a storage system over a network, the storage system comprising a plurality of storage devices, one or more of the storage devices comprising a source logical unit that is designated for migration to a target logical unit, to additional host devices different portions of the source logical unit designated for migration to the target logical unit, each of the additional host devices being configured to migrate the corresponding assigned portion of the source logical unit to the target logical unit;
in conjunction with migration of the assigned portions of the source logical unit to the target logical unit by the corresponding additional host devices, receiving, by the first host device, from the additional host devices respective sets of information each characterizing one or more writes directed to their corresponding assigned portions of the source logical unit during the migration of their corresponding assigned portions of the source logical unit to the target logical unit; and
updating the target logical unit based at least in part on the received sets of information;
wherein the first host device comprises a processor coupled to a memory.

12. The method of claim 11 further comprising determining, by the first host device, a storage capacity of the source logical unit, wherein the portions are determined based at least in part on the determined storage capacity of the source logical unit.

13. The method of claim 11 further comprising determining, by the first host device, a number of host devices that are associated with the source logical unit, wherein the portions are determined based at least in part on the determined number of host devices.

14. The method of claim 11 wherein the sets of information each characterizing one or more writes directed to the corresponding assigned portion during the migration are generated by the additional host devices based at least in part on changed block tracking in which the additional host devices track writes directed to the corresponding assigned portions of the source logical unit during the migration.

15. The method of claim 11 further comprising generating, by the first host device, in conjunction with updating the target logical unit based at least in part on the received sets of information, one or more additional sets of information characterizing one or more new writes directed to the source logical unit.

16. The method of claim 15 further comprising iteratively, by the first host device:
- updating the target logical unit based at least in part on the one or more additional sets of information characterizing the one or more new writes; and
- in conjunction with updating the target logical unit based at least in part on the one or more additional sets of information characterizing the one or more new writes, generating one or more additional sets of information characterizing one or more new writes directed to the source logical unit.

17. The method of claim 16 further comprising, by the first host device:
- iterating the updating of the target logical unit based at least in part on the one or more additional sets of information and the generating of one or more additional sets of information until a predetermined condition is met; and
- responsive to the predetermined condition being met, causing a suspension of input-output operations, completing updating of the target logical unit based at least in part on any of the remaining one or more additional sets of information, causing a re-direction of new input-output operations from the source logical unit to the target logical unit, and causing a resumption of input-output operations.

18. A computer program product comprising a non-transitory processor-readable storage medium having stored therein program code of one or more software programs, wherein the program code, when executed by a first host device comprising a processor coupled to a memory, the first host device being configured to communicate with a storage system over a network, the storage system comprising a plurality of storage devices, one or more of the storage devices comprising a source logical unit that is designated for migration to a target logical unit, causes the first host device:
- to assign to additional host devices different portions of the source logical unit designated for migration to the target logical unit, each of the additional host devices being configured to migrate the corresponding assigned portion of the source logical unit to the target logical unit;
- in conjunction with migration of the assigned portions of the source logical unit to the target logical unit by the corresponding additional host devices, to receive from the additional host devices respective sets of information each characterizing one or more writes directed to their corresponding assigned portions of the source logical unit during the migration of their corresponding assigned portions of the source logical unit to the target logical unit; and
- to update the target logical unit based at least in part on the received sets of information.

19. The computer program product of claim 18 wherein the first host device is configured to determine a number of host devices that are associated with the source logical unit, and wherein the portions are determined based at least in part on the determined number of host devices.

20. The computer program product of claim 18 wherein the sets of information each characterizing one or more writes directed to the corresponding assigned portion during the migration are generated by the additional host devices based at least in part on changed block tracking in which the additional host devices track writes directed to the corresponding assigned portions of the source logical unit during the migration.

* * * * *